United States Patent [19]

Tourneux et al.

[11] Patent Number: 5,468,071
[45] Date of Patent: Nov. 21, 1995

[54] BEARING SHELL FOR HEAVILY LOADED BEARINGS WITH A ROLLED STRIP INTERFERENCE OR FORCE FIT LINING

[75] Inventors: Daniel Tourneux, Firminy; René Mariatte, Saint Paul en Jarez; Bernard Dajoux, Andrezieux, all of France

[73] Assignee: Centre Stephanois De Recherches Mecaniques Hydromecanique et Frottement, Andrezieux-Boutheon, France

[21] Appl. No.: 86,842

[22] Filed: Jul. 7, 1993

[30] Foreign Application Priority Data

Jul. 10, 1992 [FR] France .................................. 92 08603

[51] Int. Cl.⁶ .................................................. F16C 33/02
[52] U.S. Cl. ........................................ 384/276; 384/275
[58] Field of Search .................................. 384/276, 275, 384/280, 282, 285, 294

[56] References Cited

U.S. PATENT DOCUMENTS

| | | | |
|---|---|---|---|
| 1,469,793 | 10/1923 | Johnson et al. | 384/276 |
| 2,283,424 | 5/1942 | Colwell et al. | 308/237 R |
| 2,288,655 | 7/1942 | Smart | 384/276 |
| 2,289,572 | 7/1942 | Underwood | 384/276 |
| 3,409,966 | 11/1968 | Hilbish | 384/276 |
| 3,667,823 | 6/1972 | Webbere | 384/276 |
| 3,912,547 | 10/1975 | Gaucher et al. | 148/6.11 |
| 4,006,043 | 2/1977 | Gaucher et al. | 148/27 |

FOREIGN PATENT DOCUMENTS

| | | |
|---|---|---|
| 773144 | 11/1934 | France . |
| 818833 | 10/1937 | France . |
| 2115505 | 7/1972 | France . |
| 2171993 | 9/1973 | France . |
| 2271307 | 12/1975 | France . |
| 2428682 | 1/1980 | France . |
| 2545922 | 4/1977 | Germany . |
| 165232 | 1/1934 | Switzerland . |

*Primary Examiner*—C. D. Crowder
*Assistant Examiner*—Bibhu Mohanty
*Attorney, Agent, or Firm*—Young & Thompson

[57] ABSTRACT

A bearing shell for heavily loaded bearings with a rolled strip interference or force fit lining comprises a generally annular body with an axial bore fitted with a lining in which a shaft turns. The lining comprises a 2 mm thick rectangle of rolled steel strip at least the bearing surface of which has been surface hardened to a depth of approximately 0.5 mm by nitriding or by carburizing and quenching. The ends of the rolled strip bear on each other. The strip is an interference or force fit in the bore of the body and has an excess length relative to the developed length of a neutral fiber of an unstressed lining between 0.3 and 9%.

12 Claims, 1 Drawing Sheet

BEARING SHELL FOR HEAVILY LOADED BEARINGS WITH A ROLLED STRIP INTERFERENCE OR FORCE FIT LINING

BACKGROUND OF THE INVENTION

1. Field of the Invention

The invention concerns a bearing shell for heavily loaded bearings operating in an abrasive environment comprising a generally annular body with an axial bore provided with a lining in which a shaft turns in contact with a bearing surface of the lining.

2. Description of the Prior Art

Various sectors of mechanical engineering require bearings which are relatively undemanding in terms of rotation speed or precision but are of rugged construction and must have:

a) good resistance to wear, especially abrasive wear (for example in contact with rust or mud);

b) good load capacity and ability to withstand dynamic overloads and impacts;

c) good friction characteristics (silent operation, requiring lubrication only at assembly time); and d) good corrosion resistance to withstand contact with water or salt spray.

Examples:

In the civil engineering sector, bearings for mechanical diggers, loaders, bucket conveyors, piston pump connecting rod small-end bearings;

In the iron and steel sector, chain transfer conveyor bearings, mold closure hinge bearings, bogie hearth furnace wheel bearings;

In the agricultural machinery sector, machine bearings, tractor front axle kingpins;

In the goods vehicle sector, suspension spring and brake linkage bearings.

Conventional bearings such as ball bearings and roller bearings designed for high rotation speeds are too costly for applications of the kind just mentioned, especially as the loads involved would require them to be highly rated and they would have to be housed in sealed enclosures to protect them from abrasion and corrosion, which would further increase the cost.

Bearings lined with relatively soft metals such as bronze and white metal are not able to withstand abrasive surroundings or high loads.

Surface-hardened steels provide a better solution to the production of bearings of the kind mentioned above; this is especially so if the surface treatment improves corrosion resistance and the coefficient of friction. Surface treatment is relatively costly, however, especially if it is restricted to the bearing surface. Also, performance under load is not so good as would be desirable.

SUMMARY OF THE INVENTION

The invention consists in a bearing shell for heavily loaded bearings operating in an abrasive environment comprising a generally annular body with an axial bore fitted with a lining in which a shaft turns in contact with a bearing surface of said lining which comprises a rectangle of steel strip of appropriate thickness rolled perpendicular to its length and an interference or force fit in the bore and at least the bearing surface of which has been surface hardened to a relative depth defined as the depth divided by the thickness between 0.23 and 0.27, said strip having an excess length relative to the developed length of a neutral fiber of an unstressed lining in the bore between 0.3 and 9%.

We have found that surface hardening to a restricted depth so as not to make the core of the strip brittle combined with sizing the lining so that the bearing surface is in compression tangentially to its surface yields a bearing shell with particularly high resistance to abrasive wear and with unexpectedly good friction properties. The detailed description of the invention will emphasize these properties.

Preferably, the relative excess length as a function of the diameter is as follows:

| Bore φ (mm) | Relative excess length (%) |
|---|---|
| 10–25 | 3–9 |
| 25–35 | 2.2–4.3 |
| 35–45 | 2–3 |
| 45–55 | 1.7–2.9 |
| 55–100 | 1.1–2.3 |
| 100–140 | 0.7–1.5 |
| 140–260 | 0.4–1.0 |
| 260 and above | 0.3–0.7 |

Note that the appropriate relative excess length is inversely proportional to the bore diameter. Large relative thicknesses of the lining are therefore associated with higher rates of plastic deformation. Strip between 1.5 and 5.0 mm thick is used in practise, with an upper limit of 15% of the bore diameter.

The surface hardening treatment is preferably a heat/chemical treatment which causes a hetero-element to diffuse into said relative depth. The hetero-element may be nitrogen from salt bath or gas nitridation, carbon from carburizing, in which case the lining is quenched, or carbon and nitrogen simultaneously from carbonitridation. Finally, the hetero-element may be chromium (chromalizing).

Good results are also achieved by quenching the bearing surface after high-frequency induction heating of the surface or by surface work hardening the bearing surface by rolling, hammer forging, burnishing, shot peening or milling.

Secondary features and the advantages of the invention will emerge from the following description given by way of example with reference to the appended drawings.

DETAILED DESCRIPTION OF THE INVENTION

Figure 1:
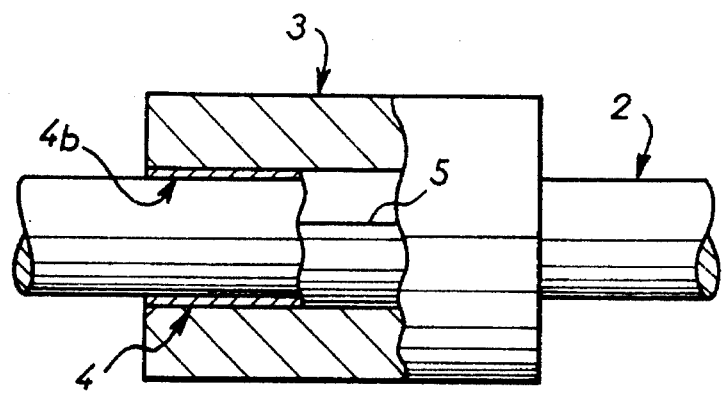
FIG. 1 shows a bearing shell in accordance with the invention in place on a shaft and partially in cross-section.

In the selected embodiment shown in the figures the bearing shell 1 in which a shaft 2 turns comprises an annular body 3 in which a cylindrical bore of diameter D3 is formed. A lining 4 is an interference or force fit in the bore. It is made from a rectangle of steel strip of thickness e rolled into a cylinder about an axis perpendicular to its longer sides.

The interior surface 4b of the lining which forms the bearing surface for the shaft 2 is surface-hardened to a depth between 0.23 and 0.27 e; the surface hardening process will be described in more detail later.

The interior and exterior of the lining 4 may both be surface hardened, for convenience, although any hardening of the exterior surface has no functional purpose.

The rolling of the rectangle of strip which constitutes the lining 4 about an axis perpendicular to its longer sides brings its two shorter sides into coincidence to form a slit 5 parallel to the axis.

Figure 2:
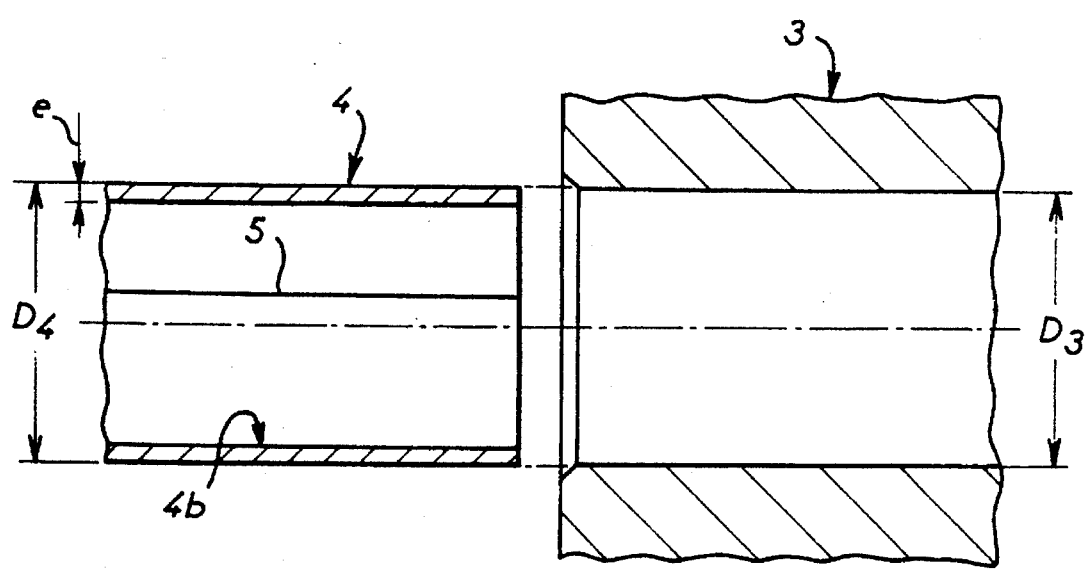
FIG. 2 is a partial diagrammatic view in cross-section of a bearing shell before insertion of the lining into the bearing shell body.

As shown in FIG. 2 the outside diameter D4 of the lining 4, prior to fitting, is greater than the diameter D3 of the bore so that fitting causes tangential compression stresses in the bearing surface 4b between limits which we have determined.

EXAMPLE 1

A bearing is required for an oscillating shaft of carburized and quenched 16NC6 steel machined to a diameter of 30 mm.

The bearing shell body is annular with an interior bore 34 mm in diameter.

The cylindrical lining has a circumferential length L and thickness e is made from 2 mm thick XC38 unalloyed steel strip cut to a width of 100 mm.

From this strip are provided rectangles of length L related to the developed length $L_o$ of the neutral fiber of the unstressed lining in the bearing having a diameter D3. The value of $L_o$ is given by the equation:

$$L_o = (D3 - e).\pi \qquad (1)$$

In this example $L_o = 100.53$ mm.

The length given by the equation:

$$L = (1 + \lambda)L_o \qquad (2)$$

is taken as of increasing value between 103 and 104 mm ($\lambda$ between 2.46 and 3.45%).

Tests carried out with L=102 and L=105 were unsuccessful. With L=102 the lining was entrained by the shaft; with L=105 the deformation of the lining on fitting was such that it was impossible to insert the shaft into the bearing shell.

The rectangles were nitrided in an alkaline carbonate and cyanate salt bath as described in FR-A-2 171 993 and FR-A-2 271 307, the depth of the hardened layer being substantially 0.5 mm or substantially one-quarter the thickness, the depth being controlled by varying the immersion time.

The bearings were wear tested with oscillating rotation through 100° of arc at a frequency of 0.67 Hz using a cycle comprising 15 seconds on and 60 seconds off.

Contact pressure: 40 MPa.
Mean peripheral speed: 0.035 m/s.
Environment: scale.
Lubrication: at assembly time—no further lubrication during the test.
Test period: 200 hours.

Wear of the bearing surface 4b was measured at the end of the test; the results are summarized in table I.

TABLE I

| L (mm) | 103 | 103.4 | 103.45 | 103.5 | 103.6 | 103.65 | 103.7 | 104 |
|---|---|---|---|---|---|---|---|---|
| λ (%) | 2.46 | 2.85 | 2.90 | 2.95 | 3.05 | 3.10 | 3.15 | 3.45 |
| wear (mm) | 0.9 | 0.55 | 0.10 | 0.09 | 0.08 | 0.11 | 0.6 | 0.8 |

Note the minimum wear for $\lambda \cong 3\%$.

Note further that semi-empirical determination of the thin tube interference or force fits for tight interference or force fit would have yielded a length L of 103.7; we have confirmed that the optimum interference or force fit for the present invention was invariably slightly less than the interference or force fits recommended for a tight interference or force fit.

Tests were then carried out to assess the optimum depth of surface hardening.

EXAMPLE 2

Starting from Example 1, a series of tests were carried out with L=103.6 ($\lambda$=3.05%) and varying the depth of nitrogen diffusion by varying the time of immersion of the parts in the salt bath.

The results are summarized in table II.

TABLE II

| relative depth | 0.4 | 0.333 | 0.286 | 0.25 | 0.222 | 0.2 | 0.182 | 0.167 |
|---|---|---|---|---|---|---|---|---|
| wear (mm) | — | 0.8 | 0.3 | 0.08 | 0.35 | 1 | 1.5 | 2.6 |

For a relative depth of 0.4 the lining was hardened virtually to the core and broke during the first few minutes of the test.

In the light of the tests carried out, and by correlating these tests with the rules for a tight interference or force fit of thin rings familiar to the man skilled in the art, we established ranges of strip excess length relative to the developed length of the neutral fiber of an unstressed lining as a function of the bore diameter. Note that the smallest diameter bore used was of 10 mm diameter, with 1.5 mm thick strip, and that however large the bore diameter may be there is no utility in exceeding a strip thickness of 4 to 5 mm.

Table III shows the ranges of relative excess length $\lambda$ as a function of the diameter $\phi$.

TABLE III

| Bore φ (mm) | λ(%) |
|---|---|
| 10–25 | 3–9 |
| 25–35 | 2.2–4.3 |
| 35–45 | 2–3 |
| 45–55 | 1.7–2.9 |
| 55–100 | 1.1–2.3 |
| 100–140 | 0.7–1.5 |
| 140–260 | 0.4–1 |
| 260 and above | 0.3–0.7 |

EXAMPLE 3

The rate of wear of a bearing as defined for Example 1 was compared with that of bearings treated using prior art processes. The results of these comparisons are summarized in table IV.

TABLE IV

| Nature of bearing shell | wear (mm) |
| --- | --- |
| Example 1 | 0.09 |
| Low-temperature electro-chemical sulfurization (FR-A-2 115 505) | 0.45 |
| Hexagonal lamellar layer (FR-A-2 428 682) | 0.35 |
| Hard chrome steel | seizure |
| Steel coated with $Cr_2O_3$ ceramic | scaling |
| Molybdenum faced steel | 2 |
| Stellite faced steel | 2 |

EXAMPLE 4

The wear of a bearing as in Example 1 was compared with a bearing of nitrided solid X38 steel. The results for five samples were as follows:

|  | wear (mm) |
| --- | --- |
| Bearing shell as in Example 1 | 0.08–0.10 |
| Solid bearing shell | 0.2–0.25 |

EXAMPLE 5

The heat/chemical treatment was varied, with all other conditions maintained constant.

TABLE V

| Heat/chemical treatment | wear (mm) |
| --- | --- |
| Salt bath nitridation | 0.09 |
| Gas nitridation | 0.15 |
| Carbonitridation | 0.12 |
| Carburizing/quenching | 0.10 |
| Chromalization | 0.18 |

Although some treatments are evidently more effective than others, in all cases the results are better than those for conventional bearings.

APPLICATION EXAMPLES

6. On mechanical diggers

The invention was applied to the bucket arm bearings which operate in oscillation at low speeds (0.01 to 0.05 m/s), with a contact pressure of 120 MPa, at ambient temperature in a relatively unabrasive environment, eight hours a day, with periodic lubrication.

The shaft is high-frequency quenched steel and the bearing shell is normally quenched carburized solid steel. The expected service life is 600 hours, although seizure is sometimes encountered after 50 hours.

The lining of the bearing shell in accordance with the invention was carburized and quenched. The service life was increased to more than 1000 hours without surface deterioration.

7. Bogie hearth furnace wheel bearing

The rotation speed is 10 rpm (Tangential speed=0.1 m/s), contact pressure 10 MPa, temperature 200°–300° C., frequency of operation five minutes every two hours. The environment is abrasive and lubrication is periodic.

The shaft is of hardened steel; the original bearing was a roller bearing—the service life was six months.

The lining of bearing shells in accordance with the invention was salt bath nitrided. These bearing shells have been in service for more than one year with no apparent deterioration.

8. Drilling machine ram end bearing

This bearing operates in oscillation at very low speed (0.05 m/s).

The pressure exceeds 100 MPa and the operating temperature is between −10° and +40° C.; operation is in an abrasive environment for 16 hours a day. Lubrication is periodic.

The shaft is of hard chrome steel. The original bearing was of solid 100C6 steel (bearing steel). Seizure occurred after a few weeks.

The lining of the invention is in quenched carburized steel. No seizure was observed in more than 12 months.

9. Hydraulic piston pump connecting rod small-end bearing

The operating conditions are: oscillation (0.3 m/s), contact pressure 15 MPa, temperature 60° C., 8 hour/day operation, hydraulic oil operating environment and sprinkler type lubrication.

The shaft is in nitrided steel; the original bearing was in spheroidal graphite cast iron. The service life was 75 hours (seizure).

The lining of the bearing in accordance with the invention is in carbonitrided steel. The service life exceeds 2000 hours.

Examples 4, 6 and 8 taken in conjunction with table I show that tangential compression stresses in the bearing surface in a limited range decisively effect the friction properties of the bearing shell in an unexpected way. Also, the existence and the values of these tangential compression stresses are not obvious, even to the man skilled in this art. Even if the "in situ" trials had not been carried out in secrecy, they would not have constituted disclosure of the invention.

Moreover, in parallel with the trials in which the surface hardening process was a heat/chemical process involving diffusion of a hetero-element into the surface layers, we conducted trials with other types of surface hardening.

Bearing shells with the same dimensions as in Example 1 were made. After rolling the bearing surfaces of the linings were hardened by quenching preceded by heating to a shallow depth by high-frequency induction heating by means of an induction coil inserted into the lining. Wear tests carried under the same conditions as in the examples indicated wear in the order of 0.20–0.23 mm. Although these results seem less good than when the linings undergo heat/chemical treatment, they remain good as compared with corresponding conventional bearings. Also, for mass production without changing the induction coil the cost of treatment is very low and the throughput can be very high.

We also carried out trials in which the bearing surface of the linings was work hardened.

Known ways of achieving work hardening include:

Rolling in which plastic deformation is brought about by rolling rollers or balls over the bearing surface, due to the restricted surface area of contact, before the lining is formed to its tubular shape.

Forging where hardening is produced by blows from a hard hammer, usually driven by compressed air.

Burnishing in which a hard tool is rubbed over the bearing surface under high pressure.

Shot peening which is frequently recommended for improving the resistance to metal fatigue and corrosion under load and which entails projecting glass, steel or ceramic balls onto the surface at high speed.

Milling which, in addition to work hardening, forms imprints on the surface which retain lubricant.

This surface work hardening causes not only hardening with a residual compressive stress but also local modification of the crystal structure of the metal, which may go so far as to confer an amorphous structure on the metal, which reduces the risk of seizure.

The steels most suitable for work hardening are carbon steels (XC 10 type), austenitic stainless steels (Z 3 CN 18-10 type) and above all manganese steels (Z 120 M 12 or Z 120 M 13 type).

Trials were conducted under the conditions of Example 1 on a 2 mm thick Z 120 M 12 steel milled with striations in the order of 0.3 to 0.4 mm deep causing hardening to a depth of approximately 0.4 to 0.5 mm. After 200 hours operation, as in the various examples, the wear did not exceed 0.1 mm, a result comparable with that of the best trials using heat/chemical treatment.

Of course, the invention is not limited to the examples described but encompasses all variant executions thereof within the scope of the claims.

There is claimed:

1. Bearing shell for heavily loaded bearings operating in an abrasive environment comprising a generally annular bearing body having an axial bore, a rolled cylindrical lining of rectangular strip steel having an interference or force fit with the bore, said lining having a bearing surface for contact with a rotating shaft, said bearing surface being surface hardened to a relative depth, defined as the depth divided by the thickness of the strip, between 0.23 and 0.27, said strip having an excess circumferential length relative to the developed circumferential length of the neutral fiber of an unstressed lining in the bore between 0.3 and 9%.

2. Bearing shell for heavily loaded bearings operating in an abrasive environment comprising a generally annular bearing body having an axial bore, a rolled cylindrical lining of rectangular strip steel having an interference or force fit with the bore, said lining having a bearing surface for contact with a rotating shaft, said bearing surface being surface hardened to a relative depth, defined as the depth divided by the thickness of the strip, between 0.23 and 0.27, said strip having an excess circumferential length relative to the developed circumferential length of the neutral fiber of an unstressed lining as a function of the diameter of the bore as follows:

| Bore φ (mm) | Relative excess length (%) |
|---|---|
| 10–25 | 3–9 |
| 25–35 | 2.2–4.3 |
| 35–45 | 1.7–2.9 |
| 55–100 | 1.1–2.3 |
| 100–140 | 0.7–1.5 |
| 140–260 | 0.4–1.0 |
| 260 and above | 0.3–0.7. |

3. Bearing shell according to claim 2 wherein the thickness of said strip is between 1.5 and 5.0 mm and does not exceed 15% of the diameter of said bore.

4. Bearing shell according to claim 1 wherein the thickness of said strip is between 1.5 and 5.0 mm and does not exceed 15% of the diameter of said bore.

5. Bearing shell according to claim 1 wherein said surface hardening treatment is a heat/chemical treatment which causes a hetero-element to diffuse into said relative depth.

6. Bearing shell according to claim 5 wherein said hetero-element is nitrogen.

7. Bearing shell according to claim 6 wherein said heat/chemical treatment is nitridation in an alkaline carbonate and cyanate salt bath.

8. Bearing shell according to claim 5 wherein said hetero-element is carbon introduced by carburization after which said strip is quenched.

9. Bearing shell according to claim 5 wherein said heat/chemical treatment is carbonitridation.

10. Bearing shell according to claim 5 wherein said hetero-element is chromium diffused by chromalization.

11. Bearing shell according to claim 1 wherein said surface hardening treatment is quenching after high-frequency induction surface heating of the bearing surface.

12. Bearing shell according to claim 1 wherein said surface hardening treatment is work hardening of the bearing surface by a process selected from rolling, forging, burnishing, shot peening and milling.

* * * * *